United States Patent [19]

Klevan

[11] Patent Number: 4,850,074
[45] Date of Patent: Jul. 25, 1989

[54] FOLDING TOOTHBRUSH

[76] Inventor: Stewart Klevan, 804 Beverly Rd., Rydal, Pa. 19046

[21] Appl. No.: 195,503

[22] Filed: May 18, 1988

[51] Int. Cl.$^4$ .............................................. A46B 9/04
[52] U.S. Cl. ................................... 15/185; 15/167.1; 15/144 R
[58] Field of Search ............... 15/184, 185, 167.1, 15/143 R, 144 R

[56] References Cited

U.S. PATENT DOCUMENTS 2,454,995 11/1948 Curran ............................ 15/185 X

FOREIGN PATENT DOCUMENTS 20268 12/1980 European Pat. Off. .............. 15/185
603148 4/1926 France ................................ 15/185
788626 7/1935 France ................................ 15/185

Primary Examiner—Peter Feldman

[57] ABSTRACT

A folding toothbrush having an articulated handle with a front portion, a center portion and a back portion. Bristles are attached to the front end of the front portion. The handle portions are joined by hinges such that the toothbrush can be stored in a folded configuration and can be opened to an operational configuration in which the handle portions are longitudinally aligned. The toothbrush is preferably made of a plastic material so that the handle can be molded as a single piece with "living" hinges. The center portion of the handle interlocks with the front and back portions when the handle is fully extended so that it will remain in its operational configuration while in use.

18 Claims, 1 Drawing Sheet

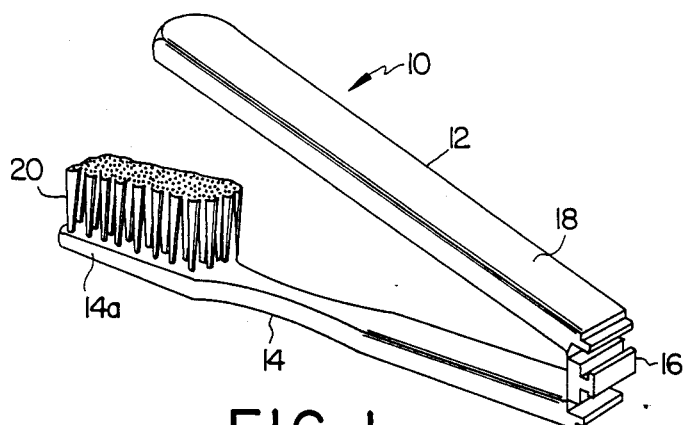
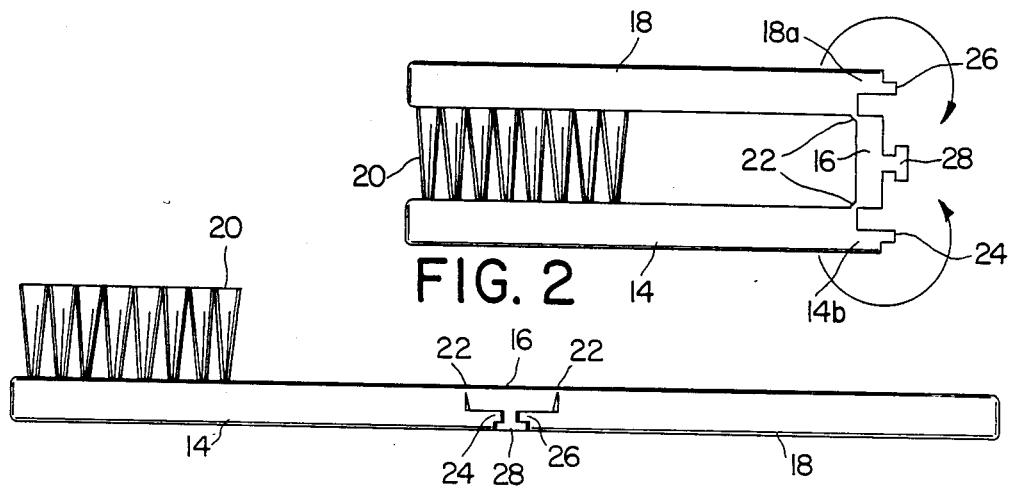
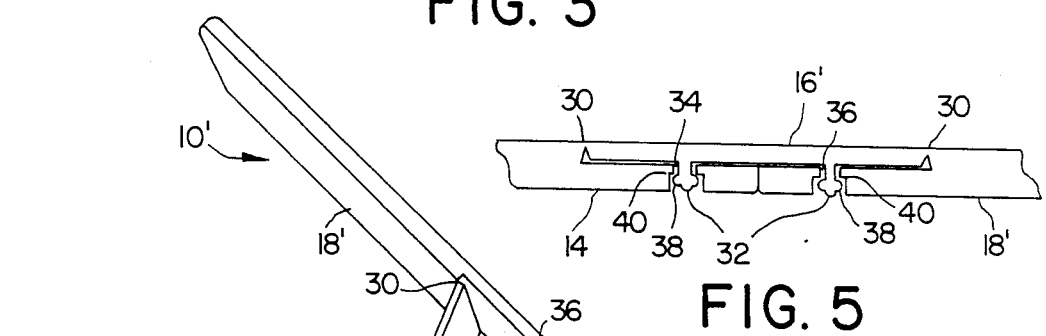
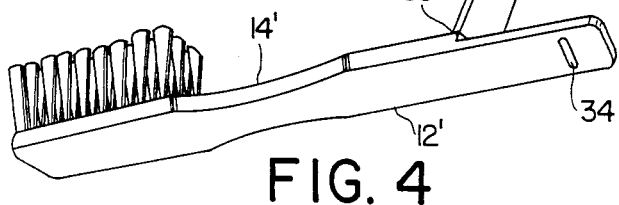

FOLDING TOOTHBRUSH

FIELD OF THE INVENTION

The present invention relates generally to toothbrushes and more particularly to a folding disposable toothbrush.

BACKGROUND ART

Frequently, persons who travel find themselves without a toothbrush. Numerous devices have been proposed to make it more convenient for a traveler to carry a toothbrush. For example, U.S. Pat. No. 174,832 entitled "Pocket Toothbrush" issued to McChesney on Mar. 14, 1876 discloses a collapsible toothbrush that may be stored within a hollow handle. Numerous variations on this theme have been described over the years.

A number of folding toothbrushes have also been disclosed. For example, U.S. Pat. Nos. 345,517 issued to Lakin; 766,247 issued to Heilrath; 905,886 issued to Kinney; 2,620,810 issued to Van Handel; 2,744,278 issued to Roth: 2,790,449 issued to Hennings: and 2,850,753 issued to Pelletier all disclose toothbrushes having a hinged handle such that the brush can be folded back upon or within the handle to make it more convenient to carry. All such toothbrushes require the assembly of numerous individual pieces in order to provide a hinged structure. Such toothbrushes are primarily intended to be repetitively used by travelers since the complexity of their structure renders them too expensive to be disposable.

Disposable toothbrushes such as may be dispensed by a vending machine or provided as a courtesy by hotels, airlines and the like, are also known in the art. For example, U.S. Pat. No. 4,521,128 issued to O'Neal discloses a disposable toothbrush having a hollow squeezable handle for dispensing a dentifrice. U.S. Pat. No. 4,530,129 issued to Labick et al discloses a disposable toothbrush which, in one embodiment, is slidingly collapsible within a hollow handle. However, these disposable toothbrushes do not offer the compact size and convenience of a folding toothbrush.

There remains a need, therefore, for a toothbrush that can be folded into a compact size, yet is inexpensive to produce such that it can be disposed of after a single use.

SUMMARY

The present invention provides a folding toothbrush having an articulated handle with a front portion, a center portion and a back portion. Bristles are attached to the front end of the front portion. The handle portions are joined by hinges such that the toothbrush can be stored in a folded configuration and can be opened to an operational configuration in which the handle portions are longitudinally aligned. After use the handle may be refolded for storage.

The toothbrush is preferably made of a plastic material so that the handle can be molded as a single piece with so called "living" hinges. The center portion of the handle preferably has a length approximately equal to the length of the bristles so that the rear portion can be folded over the bristles such that the front and rear portions are approximately parallel.

The center portion of the handle interlocks with the front and back portions when the handle is fully extended so that it will remain in its operational configuration while in use.

BRIEF DESCRIPTION OF DRAWINGS

FIG. 1 is a perspective view of a first embodiment of the present invention.

FIG. 2 is a side elevation view of the embodiment of FIG. 1 in its folded configuration.

FIG. 3 is a side elevation view of the embodiment of FIG. 1 in its fully open operational configuration.

FIG. 4 is a perspective view of an alternative embodiment of the present invention.

FIG. 5 is a partial cross-sectional view of the embodiment of FIG. 4 in its fully open operational configuration.

DETAILED DESCRIPTION OF THE PREFERRED EMBODIMENT

A folding toothbrush whose handle may be molded as a single piece is disclosed. In the following description, for purposes of explanation and not limitation, specific numbers, dimensions, materials, etc. are set forth in order to provide a thorough understanding of the present invention. However, it will be apparent to one skilled in the art that the present invention may be practiced without these specific details.

A folding toothbrush 10 according to the present invention is shown in FIGS. 1-3. Handle 12 of toothbrush 10 includes front portion 14, center portion 16 and back portion 18. Brush bristles 20 are attached to the front end 14a of front portion 14.

Handle 12 is articulated so that it can be folded as shown in FIG. 2 with back portion 18 resting on bristles 20. Center portion 16 is connected to front and back portions 14 and 18, respectively, by hinges 22. In a preferred embodiment, handle 12 is made of a plastic material such as low density polyethylene so that hinges 22 can be formed integrally with handle 12. Hinges 22 comprise a thin section of material connecting the adjoining handle portions so that movement through a large angle is possible without fracturing the material. Such hinges are well known in the plastics fabrication art and are sometimes referred to as "living" hinges. Handle 12, including hinges 22, can be conveniently manufactured as a single injection molding. Bristles 20 are secured to front end 14a of front portion 14 using techniques that are well known in the art of bristle brush manufacturing.

The folded configuration of toothbrush 10 as illustrated in FIG. 2 allows it to be packaged in a relatively small volume such as is desirable if toothbrush 10 is dispensed in a vending machine or is to be carried while travelling. Toothbrush 10 is unfolded into its operating configuration as illustrated in FIG. 3. In this configuration, all portions of handle 12 are aligned longitudinally and locked into the operating position as described below. After use, the toothbrush may be refolded for storage if desired.

Front portion 14 includes a flange-like locking step 24 at back end 14b. Back portion 18 includes a corresponding locking step 26 at front end 18a. Center portion 16 includes "T" shaped bridge member 28 which interlocks with steps 24 and 26 when toothbrush 10 is in its operating configuration as shown in FIG. 3. The dimensions of steps 24 and 26 and of "T" shaped bridge 28 are selected such that steps 24 and 26 can be snapped under bridge 28 without applying undue force, but yet securely retain handle 12 in its fully open operating configuration. Handle 12 operates with a "snap" action due to the resilience of the plastic material from which it is made and the natural compliance of hinges 22.

An alternative embodiment of the present invention is shown in FIGS. 4 and 5. Toothbrush 10' is substantially similar to toothbrush 10 as described above except for the details of its locking mechanism. Center portion 16' of handle 12' is connected to front portion 14' and back portion 18' by hinges 30 which are made in the same manner as hinges 22 of the previously described embodiment.

Locking tabs 32 project from the bottom surface of center portion 16'. Locking tabs 32 engage locking hole 34 in front portion 14' and locking hole 36 in back portion 18' when toothbrush 10' is in its fully open operating configuration as shown in FIG. 5. Locking tabs 32 may include ridges 38 which snap within locking holes 34 and 36 against ledges 40 so as to securely lock toothbrush 10' in its open configuration. The material of which handle 12' is made is sufficiently resilient that ridges 38 can pass through locking holes 34 and 36 without exerting undue force.

It will be recognized that the above described invention may be embodied in other specific forms without departing from the spirit or essential characteristics of the disclosure. Thus, it is understood that the invention is not to be limited by the foregoing illustrative details except as set forth in the appended claims.

I claim:

1. A folding toothbrush comprising:
   an articulated handle having a front portion, a center portion and a back portion hingedly connected to one another, each of said front, center and back portions having opposing front and back ends and further having opposing first and second sides;
   a plurality of bristles disposed on said first side of said front portion at said front end thereof; and
   locking means for locking said front, center and back portions of said articulated handle in longitudinal alignment;
   wherein said locking means comprises a first locking step projecting from said back end of said front portion, a second locking step projecting from said front end of said back portion and a "T" shaped bridge on said center portion such that said first and second locking steps lock beneath respective sides of said "T" shaped bridge when said front, center and back portions of said articulated handle are longitudinally aligned.

2. The folding toothbrush of claim 1 wherein said front portion is connected to said center portion at a first hinge and said center portion is connected to said back portion at a second hinge.

3. The folding toothbrush of claim 2 wherein at least one of said first and second hinges is a living hinge.

4. The folding toothbrush of claim 2 wherein said articulated handle is molded in one piece.

5. The folding toothbrush of claim 4 wherein said center portion and said bristles are approximately equal in length so that said first side of said back portion rests on said bristles with said front and back portions approximately parallel when said articulated handle is in a folded configuration.

6. The folding toothbrush of claim 5 wherein said front and back portions are approximately equal in length.

7. A folding toothbrush comprising:
   an articulated handle having a front portion, a center portion and a back portion hingedly connected to one another, each of said front, center and back portions having opposing front and back ends and further having opposing first and second sides;
   a plurality of bristles disposed on said first side of said front portion at said front end thereof; and
   locking means for locking said front, center and back portions of said articulated handle in longitudinal alignment;
   wherein said locking means comprises first and second locking tabs extending from said second side of said center portion, a first locking hole extending through said back end of said front portion, and a second locking hole extending through said front end of said back portion so that said first locking tab locks within said first locking hole and said second locking tab locks within said second locking hole when said front, center and back portions of said articulated handle are longitudinally aligned.

8. The folding toothbrush of claim 7 wherein said front portion is connected to said center portion at a first hinge and said center portion is connected to said back portion at a second hinge.

9. The folding toothbrush of claim 8 wherein at least one of said first and second hinges is a living hinge.

10. The folding toothbrush of claim 8 wherein said articulated handle is molded in one piece.

11. The folding toothbrush of claim 10 wherein said center portion and said bristles are approximately equal in length so that said first side of said back portion rests on said bristles with said front and back portions approximately parallel when said articulated handle is in a folded configuration.

12. The folding toothbrush of claim 11 wherein said front and back portions are approximately equal in length.

13. A folding toothbrush comprising:
   an articulated handle having a front portion, a center portion and a back portion, each of said front, center and back portions having opposing front and back ends and further having opposing first and second sides;
   a plurality of bristles disposed on said first side of said front portion at said front end thereof;
   a first hinge connecting said back end of said front portion and said front end of said center portion;
   a second hinge connecting said front end of said back portion and said back end of said center portion;
   a first locking step extending from said back end of said front portion;
   a second locking step extending from said front end of said back portion;
   a "T" shaped bridge extending from said second side of said center portion such that said first and second locking steps lock beneath respective sides of said "T" shaped bridge when said front, center and back portions of said articulated handle are longitudinally aligned.

14. The folding toothbrush of claim 13 wherein at least of said first and second hinges is a living hinge.

15. The folding toothbrush of claim 13 wherein said articulated handle is molded in one piece.

16. The folding toothbrush of claim 15 wherein said center portion and said bristles are approximately equal in length so that said first side of said back portion rests on said bristles with said front and back portions approximately parallel when said articulated handle is in a folded configuration.

17. The folding toothbrush of claim 16 wherein said front and back portions are approximately equal in length.

18. A folding toothbrush comprising:
an articulated handle having a front portion, a center portion and a back portion, said front portion connected to said center portion at a first hinge and said center portion connected to said back portion at a second hinge, each of said front, center and back portions having opposing front and back ends and further having opposing first and second sides;
a plurality of bristles disposed on said first side of said front portion at said front end thereof; and
locking means for locking said front, center and back portions of said articulated handle in longitudinal alignment;
wherein said articulated handle, including said first and second hinges, and said locking means are molded in one piece.

* * * * *